United States Patent [19]

Messina

[11] Patent Number: 5,467,733
[45] Date of Patent: Nov. 21, 1995

[54] FEEDER BOWL FOR A BIRD IN A CAGE

[76] Inventor: Anthony Messina, 10502 Tolman St., Houston, Tex. 77034

[21] Appl. No.: 291,517

[22] Filed: Aug. 15, 1994

[51] Int. Cl.$^6$ ............................ A01K 5/01; A01K 39/014
[52] U.S. Cl. ............................ 119/18; 119/61; 248/312.1; 248/313
[58] Field of Search ................................ 119/18, 61, 26; 248/311.2, 312, 312.1, 313, 316.1, 315

[56] References Cited

U.S. PATENT DOCUMENTS

| 1,582,723 | 4/1926 | Ahlman | 119/61 |
| 2,331,511 | 10/1943 | Schiffman | 119/18 |
| 3,661,121 | 5/1972 | Zielin | 119/61 |
| 4,995,342 | 2/1991 | Hinrichs et al. | 119/18 |
| 5,513,957 | 5/1994 | Garay et al. | 119/26 |

FOREIGN PATENT DOCUMENTS 658570  11/1986  Switzerland ............................ 119/61

Primary Examiner—Todd E. Manahan
Attorney, Agent, or Firm—Harrison & Egbert

[57] ABSTRACT

A feeder bowl for a bird or other animal in a cage includes a bowl having an open top and a closed bottom and has a notch extending outwardly therefrom between the open top and the closed bottom, a clamp ring extending around at least a portion of an exterior circumference of the bowl and positioned between the open top and the notch, and an attachment mechanism connected to the clamp ring for affixing the clamp ring to a cage. The bowl has an upper lip extending outwardly of the open top and having a greater circumference than the bowl below the upper lip. The notch is roll formed on the bowl so as to extend around a circumference of the bowl below the upper lip. The clamp ring has a curved flange affixed thereto. The curved flange is juxtaposed against an exterior surface of the bowl between the upper lip and the notch. The clamp ring includes a cross member having a curved flange affixed thereto. The curved flange of the cross member is juxtaposed against an exterior surface of the bowl on the opposite side of the bowl from the curved flange of the clamp ring. An expansion mechanism is connected to the clamp ring so as to vary a compressive force of the clamp ring upon the exterior surface of the bowl.

15 Claims, 2 Drawing Sheets

5,467,733

FEEDER BOWL FOR A BIRD IN A CAGE

TECHNICAL FIELD

The present invention relates to feeder bowls. More particularly, the present invention relates to feeder bowls for use in cages which contain relatively large birds therein. Additionally, the present invention relates to feeder bowls that can be rigidly affixed within an interior of a cage.

BACKGROUND ART

In traditional bird and animal cages, feeder bowls are positioned within the cage so as to allow the bird to easily ingest food and water. However, when very large birds or animals are contained within a cage, they often can damage or solve (dislodge) the bowl support containment mechanism. When the bowl is removed from the support mechanism, the animal then can spill food or water into the cage and floor. With many feed bowl support mechanisms, the bird can dislodge the feed bowl in a relatively short amount of time. As such, there has been a need to develop a feed bowl holder (retainer) which makes it very difficult for large birds to dislodge and/or damage bowls.

Under many circumstances, the owner of a bird or animal will have to replace the feeder bowl periodically. Whenever the feeder bowl must be replaced, it creates an unnecessary expense to the owner of the bird.

In many feed bowl support or containment devices, whenever the bowl is significantly deformed, the support device will no longer accommodate the bowl. Under such circumstances, either the bowl or the support device must be replaced. Any support or containment devices should be configured so that it is very difficult or impossible for a bird or animal to peck or claw at the support device in a way that would allow the support device to become dislodged so as to release the bowl.

It is an object of the present invention to provide a feeder bowl which is very difficult to damage or dislodge by the bird or animal.

It is a further object of the present invention to provide a support device for the feeder bowl which allows the feeder bowl to be easily removed and/or replaced.

It is another object of the present invention to provide a feeder bowl apparatus that is resistive to manipulation by the bird.

It is still a further object of the present invention to provide a feeder bowl apparatus that is easy to use, relatively inexpensive, and easy to manufacture.

These and other objects and advantages of the present invention will become apparent from a reading of the attached specification and appended claims.

SUMMARY OF THE INVENTION

The present invention is a feeder bowl for a bird or animal in a cage that comprises a bowl having an open top and a closed bottom and a notch extending outwardly therefrom between the open top and the closed bottom, a clamp ring extending around at least a portion of an exterior circumference of the bowl between the open top and the notch, and an attachment mechanism to the clamp ring so as to allow the clamp ring to be affixed to the cage.

The bowl has an upper lip extending outwardly of the open top. This upper lip has a greater circumference than the remainder of the bowl below the upper lip. The notch is roll formed on the bowl so as to extend around a circumference of the bowl below the upper lip. The notch is in generally parallel relationship to the upper lip and to the closed bottom. The clamp ring has a curved flange affixed thereto. This curved flange is juxtaposed against an exterior surface of the bowl. The curved flange is affixed to an interior of clamp ring and is juxtaposed against the bowl between upper lip and the notch. The clamp ring has a curved portion having a radius generally corresponding to a radius of the bowl. The clamp ring includes linear arms which extend from the ends of the curved portion. The clamp ring has a cross member extending transversely from one of the linear arms to the other of the linear arms. The cross member is in abutment with an exterior surface of the bowl. Specifically, the cross member includes a curved flange affixed thereto. This curved flange has a radius corresponding to a radius of the bowl. The curved flange is juxtaposed against the exterior surface of the bowl. The curved flange of the clamp ring is positioned on an opposite side of the bowl from the curved flange of the cross member.

At least one of the linear arms includes a screw mechanism connected thereto. This screw mechanism is rotatable so as to vary a compressive force of the clamp ring upon an exterior surface of the bowl. The screw mechanism includes a threaded receptacle affixed to an end of one of the linear arms opposite the curved portion. A threaded member threadedly engages the threaded receptacle. The threaded member is rotatably supported on the attachment mechanism. A socket is formed at an end of the threaded member opposite the threaded receptacle. The socket is rotatable for rotating the threaded member. A wrench can be provided having an end detachably received within the socket. The wrench is flexibly affixed to the attachment mechanism.

In the present invention, the attachment mechanism includes a first plate affixed to an end of the clamp ring. The first plate has a bolt extending outwardly therefrom. A second plate is provided which has a hole formed therein. The bolt extends through the hole of the second plate such that the plates are in generally parallel relationship to each other. A nut is threadedly received by the bolt on a side of the second plate opposite the first plate. The nut is tightenable so as to secure the plates to the cage.

DETAILED DESCRIPTION OF THE INVENTION

Figure 1:
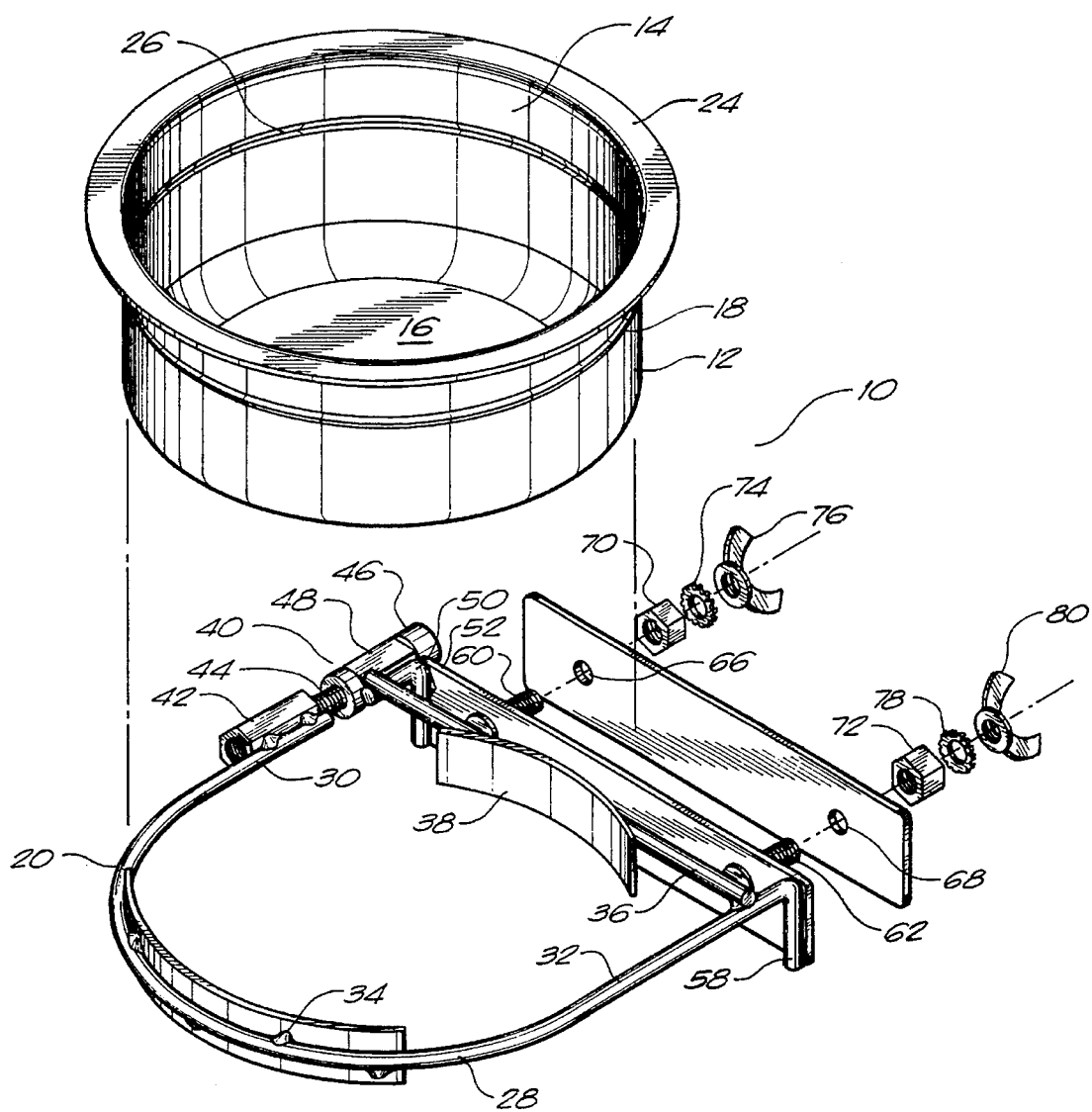
FIG. 1 is an exploded perspective view of the feeder bowl in accordance with the present invention.

Referring to FIG. 1, there is shown at 10 the feeder bowl apparatus in accordance with the preferred embodiment of the present invention. The feeder bowl apparatus 10 includes a bowl 12 having an open top 14 and a closed bottom 16. The bowl 12 includes a notch 18 which extends outwardly of the exterior surface of the bowl 12 between the open top and the closed bottom 16. A clamp ring 20 extends around at least a portion of the exterior circumference of the bowl 12. As will be described hereinafter, the clamp ring 20 is positioned between the bowl lip 24 and the notch 18 of bowl 12. An attachment mechanism 22 is connected to the clamp ring 20 and serves to allow the clamp ring to be affixed to the cage.

With rotatably to FIG. 1, the bowl 12 is a stainless steel feeder bowl having an open top 14 and a closed bottom 16. An upper lip 24 extends outwardly of the open top 14. This upper lip 24 has a greater circumference than the rest of the bowl 12 below the upper lip 24. The notch 18 is roll formed on the bowl so as to extend around the circumference of the bowl below the upper lip 24. As can be seen, the notch 18 is in generally parallel relationship to the upper lip 24 and to the closed bottom 16. The notch 18 is seen as an indentation 26 on the interior of the bowl 12. The interior of the bowl 12 is used for the receipt of water and/or food for the bird or animal in the cage. The rigid stainless steel configuration of the bowl 12 is resistive to damage by the bird or animal.

The clamp ring 20 includes a curved portion 28 having a radius corresponding to a radius of the bowl 12. The curved portion 28 has linear arms 30 and 32 extending from the ends of the curved portion 28. A curved flange 34 is affixed to an interior of the curved portion 28 of the clamp ring 20. The curved flange 34 has a width that is generally greater than the diameter of the clamp ring 20. As will be described hereinafter, the curved flange 34 will reside in surface-to-surface contact with the exterior surface of the bowl 12 between the notch 18 and the upper lip 24.

In FIG. 1, it can be seen that a cross member 36 extends transversely from the linear arm 32 toward the other linear arm 30. In normal use, the cross member 36 will be in abutment with an exterior surface of the bowl 12. It can be seen that the cross member 36 includes a curved flange 38 affixed to an inner surface of the cross member 36. The curved flange 38 has a radius which generally corresponds to a radius of the bowl 12. As will be described hereinafter, the curved flange 38 will be juxtaposed against an exterior surface of the bowl 12 between the notch 18 and the upper lip 24. It can be seen that the curved flange 34 of the curved portion 28 of clamp ring 20 faces the curved flange 38 of the cross member 36. In normal use, the curved flange 34 will be on the opposite side of the bowl 12 from the curved flange 38.

A screw or other expansion control mechanism 40 is connected to the linear arm 30 of the clamp ring 20. The screw or other expansion control mechanism 40 serves to control a compressive force of the clamp ring 20 around the exterior surface of the bowl 12. Additionally, the screw or other expansion control mechanism 40 serves to allow for the release of the bowl 12 and for the reinstallation of the bowl 12 between the flanges 34 and 38 of the clamp ring 20. The linear arm 30 is affixed to the threaded receptacle 42. As illustrated in FIG. 1, the threaded receptacle 42 is welded to an exterior surface of the linear arm 30 of clamp ring 20. A threaded member 44 threadedly engages the threaded receptacle 42. This threaded member 44 is rotatably supported on the attachment mechanism 22. In normal use, the rotation of the threaded member 44 will draw the threaded receptacle 42 toward or away from the attachment mechanism 22. When it is necessary to remove the bowl 12, then the threaded member 44 should be rotated so that the threaded receptacle 42 moves outwardly. If it is necessary to reinstall the bowl 12, then the threaded member 44 should be rotated so as to draw the threaded receptacle 42 inwardly. This movement will control the compressive force upon the exterior surface of the bowl 12. A socket 46 is formed at an end of the threaded member 44 opposite the threaded receptacle 42. The socket 46 is suitable for rotating the threaded member 44. It can be seen that the threaded member 44 extends from the socket 46 through a housing 48. The housing 48 is affixed to a support bar 50 of cross member 36 and also affixed to a first plate 52 of the attachment mechanism 22. A key having an appropriately configured tab can be detachably received within the socket 46. The key should have an end which will mate with a similarly geometrically shaped opening in the socket 46. After the manipulation of the threaded member 44 and the threaded receptacle 42 is carried out for the removal or installation of the bowl 12, the key can be removed from the socket 46 so as to prevent the bird from manipulating the mechanism.

The attachment mechanism 22 includes the first plate 52 extending in transverse planar relationship to the plane of the clamp ring 20. The ends 50 and 58 of the clamp ring 20 are affixed to a back surface of the first plate 52. The first plate 52 includes bolts 60 and 62 extending outwardly therefrom. The bolts 60 and 62 extend outwardly in transverse relationship to the plate 52. A second plate 64 has holes 66 and 68 formed therein. The bolts 60 and 62 extend through the hole 66 and 68, respectively, of the second plate 64. In this manner, the plate 64 will be maintained in generally parallel relationship to the first plate 52. When the bolts 60 and 62 extend through the holes 66 and 68, respectively, of the second plate 64, then nuts 70 and 72 are threadedly affixed over the ends of the bolts 60 and 62, respectively. With respect to bolt 60, the nut 70 is threadedly affixed thereto, along with a lock washer 74 and a wingnut 76. A nut 72 is threadedly affixed on to the end of the bolt 62, along with a lock washer 78 and a wingnut 80. This arrangement will allow for the plates 52 and 64 to be securely affixed to the cage. In particular, the wires or bars of the cage will be interposed between the interior surfaces of the plates 52 and 64.

Figure 2:
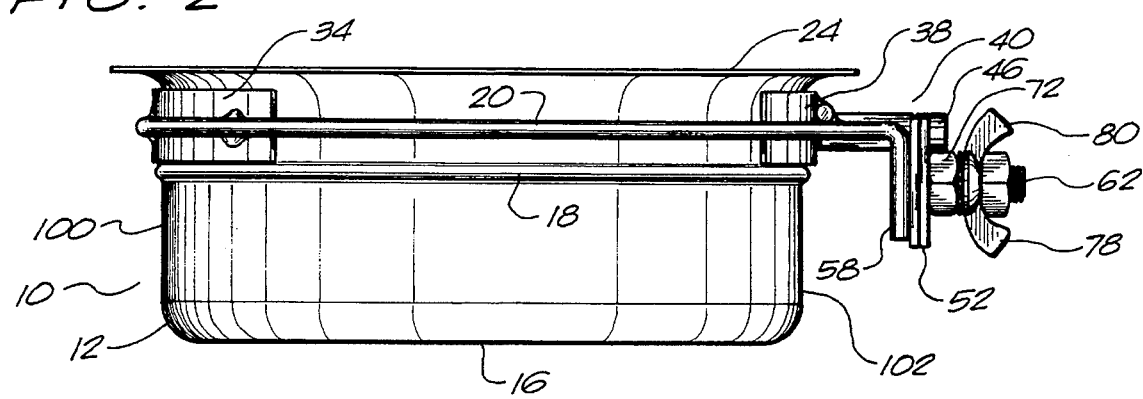
FIG. 2 is a side elevational view of the feeder bowl in accordance with the present invention.

FIG. 2 shows how the clamp ring 20 is secured to the exterior surface of the bowl 12. In particular, it can be seen that the clamp ring 20 will extend around the exterior surface of the bowl 12 between the notch 18 and the upper lip 24. The curved flange 34 is illustrated as juxtaposed and in surface-to-surface contact with an exterior surface at the forward portion 100 of bowl 12. The flange 38 is also juxtaposed against and in surface-to-surface contact with the bowl 12 between the notch 18 and the upper lip 24 at the rearward end 102 of the bowl 12. The relationship of the notch 18 and the upper lip 24 allows the bowl 12 to be securely received within the clamp ring 20. Any downward forces imparted upon the bowl 12 will cause the upper lip 24 to contact the flanges 34 and 36 and, thereby, resist movement. If any upward movement is applied to the bowl 12, then the notch 18 will resist the upward movement of the bowl 12. In this manner, the feed bowl will be securely maintained in its proper position within the cage.

In FIG. 2, it can be seen that the end 58 of the clamp ring 20 is secure to a surface of the first plate 52. The socket 46 of the screw mechanism 40 extends outwardly of the second plate 64. In this manner, the socket 46 is in a proper position so as to receive the end of a detachable key. It can also be seen that the bolt 62 extends through the hole 68 in the second plate 64 and has nut 72 extending therearound, along with lock washer 78. This arrangement should effectively prevent the bird from manipulating the attachment mechanism so as to dislodge the feed bowl apparatus 10 from its intended position.

Figure 3:
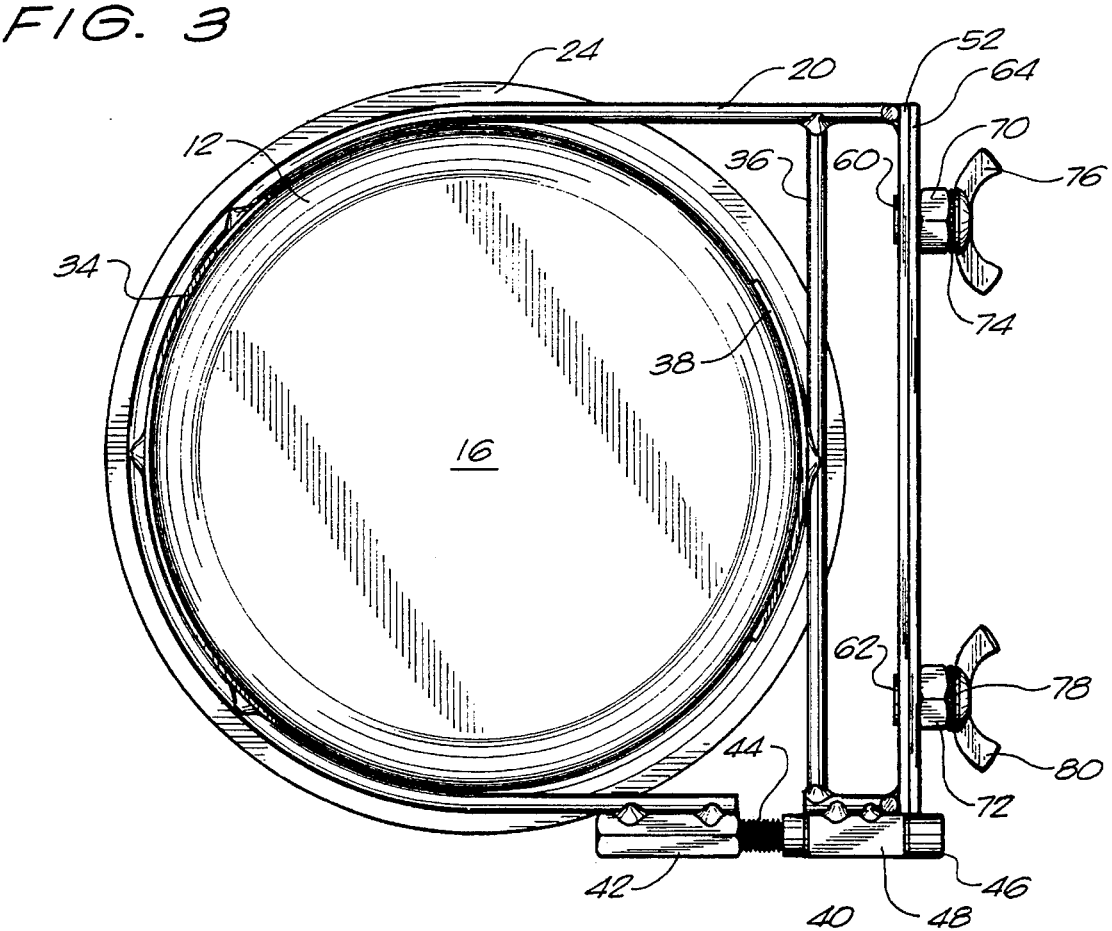
FIG. 3 is a plan view of the feeder bowl in accordance with the present invention.

FIG. 3 shows a bottom view of the bowl 12 as positioned within the clamp ring 20. In particular, it can be seen that the flanges 34 and 38 of the clamp ring 20, and its cross member 36, conform to the exterior surface of the bowl 12 below the upper lip 24. It can be seen that the flanges 34 and 38 have a radius which generally corresponds to the exterior radius of the bowl 12. In this manner, the flanges 34 and 38 of the clamp ring serve to effectively secure the position of the bowl 12. The securing of the bowl 12 within the clamp ring 20 is accomplished by the tightening of the screw mechanism 40 so as to draw the threaded receptacle 42 toward the housing 48 for the threaded member 44. This is accomplished in the manner described hereinbefore.

In FIG. 3, it can be seen that the nut 70, the lock washer 74 and the wingnut 76 are secured to the bolt 60. Similarly, at the other end of the plates 52 and 64, the nut 72, the lock washer 78 and the wingnut 80 are secured to the bolt 62. In normal use, a portion of the cage will be interposed between the plates 52 and 64. The tightening of these nuts 70 and 72 serves to secure the plates 52 and 64 to the cage.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

I claim:

1. A feeder bowl for a bird or animal in a cage comprising:
   a bowl having an open top and a closed bottom, said bowl having a notch extending outwardly therefrom between said open top and said closed bottom;
   a clamp ring extending around at least a portion of an exterior circumference of said bowl, said clamp ring positioned between said open top and said notch, said clamp ring having a curved portion having a radius generally corresponding to a radius of said bowl, said clamp ring having linear arms extending from ends of said curved portion, one of said linear arms having an expansion means connected thereto, said expansion means rotatable so as to vary a compressive force of said clamp ring upon an exterior surface of said bowl; and
   attachment means connected to said clamp ring, said attachment means for affixing said clamp ring to the cage.

2. The feeder bowl of claim 1, said bowl having an upper lip extending outwardly of said open top, said upper lip having a greater circumference than a circumference of said bowl below said upper lip.

3. The feeder bowl of claim 2, said notch being roll formed on said bowl so as to extend around a circumference of said bowl below said upper lip.

4. The feeder bowl of claim 3, said notch being in generally parallel relationship to said upper lip and to said closed bottom.

5. The feeder bowl of claim 2, said clamp ring having a curved flange affixed thereto, said curved flange having a width less than a distance of said upper lip from said notch, said curved flange in surface-to-surface contact with an exterior surface of said bowl.

6. The feeder bowl of claim 5, said curved flange affixed to an interior of said clamp ring, said curved flange affixed between said upper lip and said notch.

7. The feeder bowl of claim 1, said clamp ring having a curved flange affixed thereto, said curved flange juxtaposed against an exterior surface of said bowl.

8. The feeder bowl of claim 1, said clamp ring having a cross member extending transversely from one of said linear arms, said cross member in abutment with an exterior surface of said bowl.

9. The feeder bowl of claim 8, said cross member having a curved flange affixed thereto, said curved flange having a radius corresponding to a radius of said bowl, said curved flange juxtaposed against said exterior surface of said bowl.

10. The feeder bowl of claim 9 said clamp ring having another curved flange affixed thereto on an opposite side of said bowl from said curved flange of said cross member, each of said curved flanges contacting said exterior surface of said bowl between said open top and said notch.

11. The feeder bowl of claim 1, said expansion means comprising:
    a threaded receptacle affixed to an end of one of said linear arms opposite said curved portion; and
    a threaded member threadedly engaging said threaded receptacle, said threaded member rotatably supported on said attachment means.

12. The feeder bowl of claim 11, said expansion means further comprising:
    a socket formed at an end of said threaded member opposite said threaded receptacle, said socket rotatable for rotating said threaded members.

13. The feeder bowl of claim 1, said attachment means comprising:
    a first plate affixed to an end of said clamp ring, said first plate having a bolt extending outwardly therefrom;
    a second plate having a hole formed therein, said bolt extending through said hole of said second plate such that said plates are in generally parallel relationship; and
    a nut threadedly received by said bolt on a side of said second plate opposite said first plate, said nut tightenable so as to secure said plates to the cage.

14. A feeder bowl for a bird or other animal in a cage comprising:
    a bowl having an open top and a closed bottom;
    a clamp ring extending around at least a portion of an exterior circumference of said bowl, said clamp ring positioned between said open top and said closed bottom, said clamp ring having a curved portion having a radius generally corresponding to a radius of said bowl, said clamp ring having linear arms extending from ends of said curved portion, at least one of said linear arms having an expansion means connected thereto, said expansion means rotatable so as to vary a compressive force of said clamp ring upon an exterior surface of said bowl, said expansion means comprising:
    a threaded receptacle affixed to an end of one of said linear arms opposite said curved portion;
    a threaded member threadedly engaging said threaded receptacle, said threaded member rotatably supported on said attachment means; and
    a socket formed at an end of said threaded member opposite said threaded receptacle, said socket rotatable for rotating said threaded members; and
    attachment means connected to said clamp ring, said attachment means for affixing said clamp ring to the cage.

15. A feeder bowl for a bird or animal in a cage comprising:
    a bowl having an open top and a closed bottom;
    a clamp ring extending around at least a portion of an exterior circumference of said bowl, said clamp ring positioned between said open top and said closed bottom, said clamp ring having a curved portion having a radius generally corresponding to a radius of said bowl, said clamp ring having linear arms extending from ends of said curved portion, at least one of said linear arms having an expansion means connected thereto, said expansion means rotatable so as to vary a compressive force of said clamp ring upon an exterior surface of said bowl, said bowl having a notch extending outwardly therefrom between said open top and said closed bottom, said bowl having an upper lip extending outwardly of said open top, said upper lip having a greater circumference than said bowl at an area below said upper lip, said notch being roll formed on said bowl so as to extend around a circumference of said bowl below said upper lip, said clamp ring having a curved flange affixed thereto, said curved flange having a width less than a distance of said upper lip from said notch, said curved flange in surface-to-surface contact with an exterior surface of said bowl between said upper lip and said notch; and attachment means connected to said clamp ring, said attachment means for affixing said clamp ring to the cage.

* * * * *